United States Patent
Kulkarni et al.

(10) Patent No.: US 11,563,466 B2
(45) Date of Patent: Jan. 24, 2023

(54) RESTRICTING UPLINK MIMO ASSIGNMENT BASED ON FADING IN AN MMWAVE SYSTEM

(71) Applicant: T-Mobile Innovations LLC, Overland Park, KS (US)

(72) Inventors: Atul Kulkarni, Brambleton, VA (US); Sreekar Marupaduga, Overland Park, KS (US); Anurag Thantharate, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/746,144

(22) Filed: May 17, 2022

(65) Prior Publication Data

US 2022/0345181 A1    Oct. 27, 2022

Related U.S. Application Data

(63) Continuation of application No. 17/237,684, filed on Apr. 22, 2021, now Pat. No. 11,374,627.

(51) Int. Cl.
| | |
|---|---|
| *H04B 7/04* | (2017.01) |
| *H04B 7/0413* | (2017.01) |
| *H04B 7/06* | (2006.01) |
| *H04W 52/02* | (2009.01) |

(52) U.S. Cl.
CPC ......... *H04B 7/0413* (2013.01); *H04B 7/0697* (2013.01); *H04W 52/0212* (2013.01)

(58) Field of Classification Search
CPC ............... H04B 7/0413; H04B 7/0697; H04W 52/0212
See application file for complete search history.

(56) References Cited

U.S. PATENT DOCUMENTS

2019/0394828 A1* 12/2019 Lei .................. H04W 24/02
2021/0058114 A1    2/2021 Molisch et al.

* cited by examiner

*Primary Examiner* — Rahel Guarino
(74) *Attorney, Agent, or Firm* — Shook, Hardy & Bacon L.L.P.

(57) ABSTRACT

Methods, media, and systems are provided for restricting an uplink Multiple Input Multiple Output (MIMO) assignment based on fading, battery data, or location data associated with a user device in an mmWave system. Fading data, location data, or battery data is received from one or more user devices. Based on the received data, a determination is made using the data received (e.g., determining the battery data of the user device is below a threshold or determining the location of the user device). In response, the assignment of the user device to an uplink MIMO layer of available MIMO layers is restricted. The restricted uplink MIMO layer is a higher MIMO layer than another MIMO layer of the available MIMO layers. In response to restricting the assignment, the user device may be assigned to an available MIMO layer that is a lower MIMO layer than the restricted MIMO layer.

20 Claims, 3 Drawing Sheets

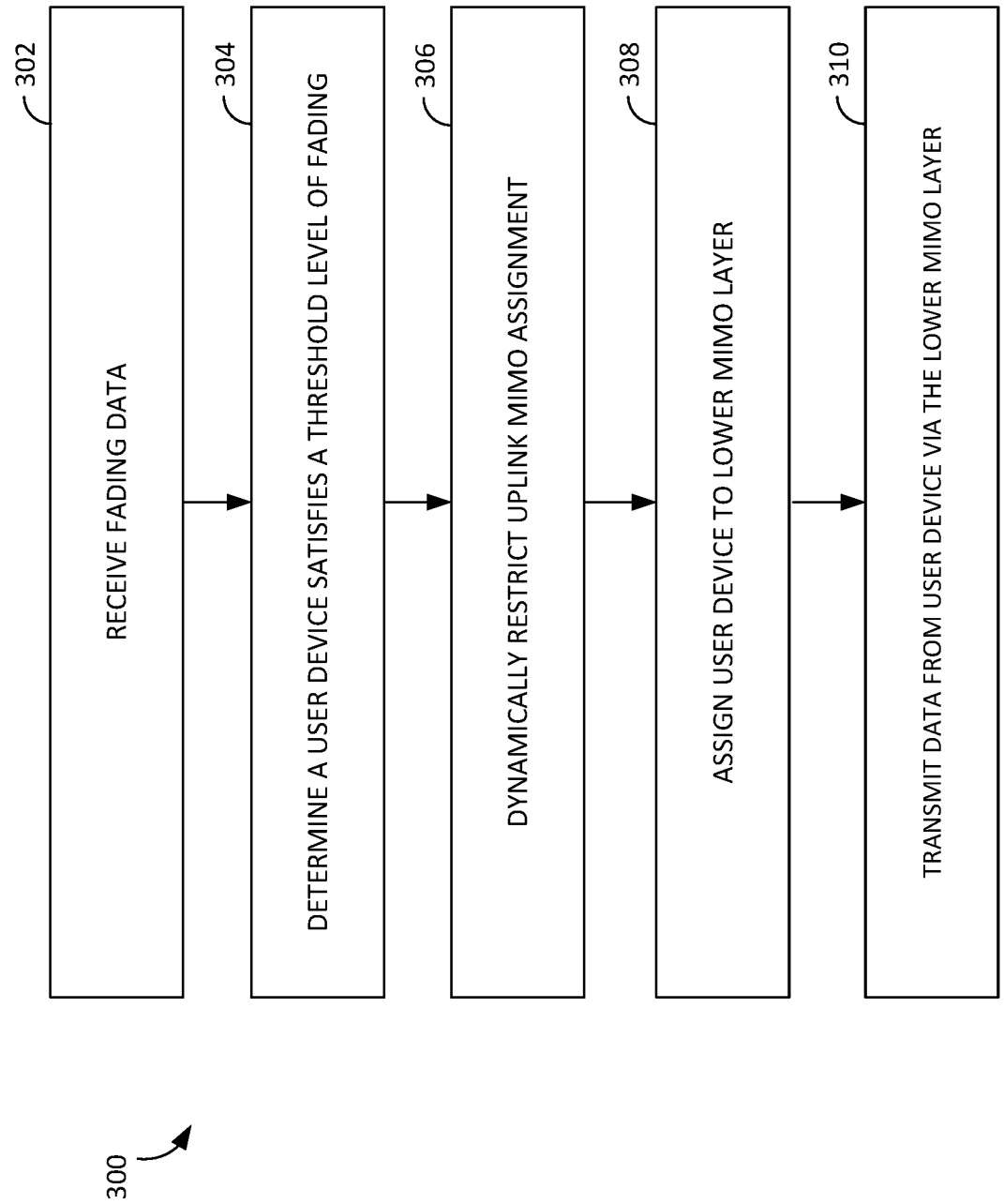

RESTRICTING UPLINK MIMO ASSIGNMENT BASED ON FADING IN AN MMWAVE SYSTEM

CROSS-REFERENCE TO RELATED APPLICATIONS

This application is a continuation of U.S. patent application Ser. No. 17/237,684, filed on Apr. 22, 2021, titled "RESTRICTING UPLINK MIMO ASSIGNMENT BASED ON FADING IN AN mmWAVE SYSTEM." The aforementioned application is assigned or under obligation of assignment to the same entity as this application, and is incorporated in its entirety in this application by reference.

SUMMARY

In brief and at a high level, the present disclosure is directed, in part, to restricting an uplink Multiple Input Multiple Output (MIMO) assignment based on fading within an mmWave environment. Methods and systems receive fading data from a user device. In aspects, the methods and systems receive the fading data from a plurality of user devices in communication with a cell sector corresponding to a cell site. In some aspects, fading data is received from another device. Further, the methods and systems determine a portion of the cell sector satisfies a threshold level of fading based on the fading data. In aspects, the methods and systems determine the user device satisfies the threshold level of fading based on the fading data. In response to determining the threshold level is satisfied, the methods and systems dynamically restrict an uplink MIMO assignment for the user device that satisfies the threshold level of fading. As such, the methods and systems assign the user device to a lower MIMO layer of available MIMO layers.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein:

FIG. 3 depicts a flow diagram of an example method in which implementations of the present disclosure may be employed.

DETAILED DESCRIPTION

Figure 1:
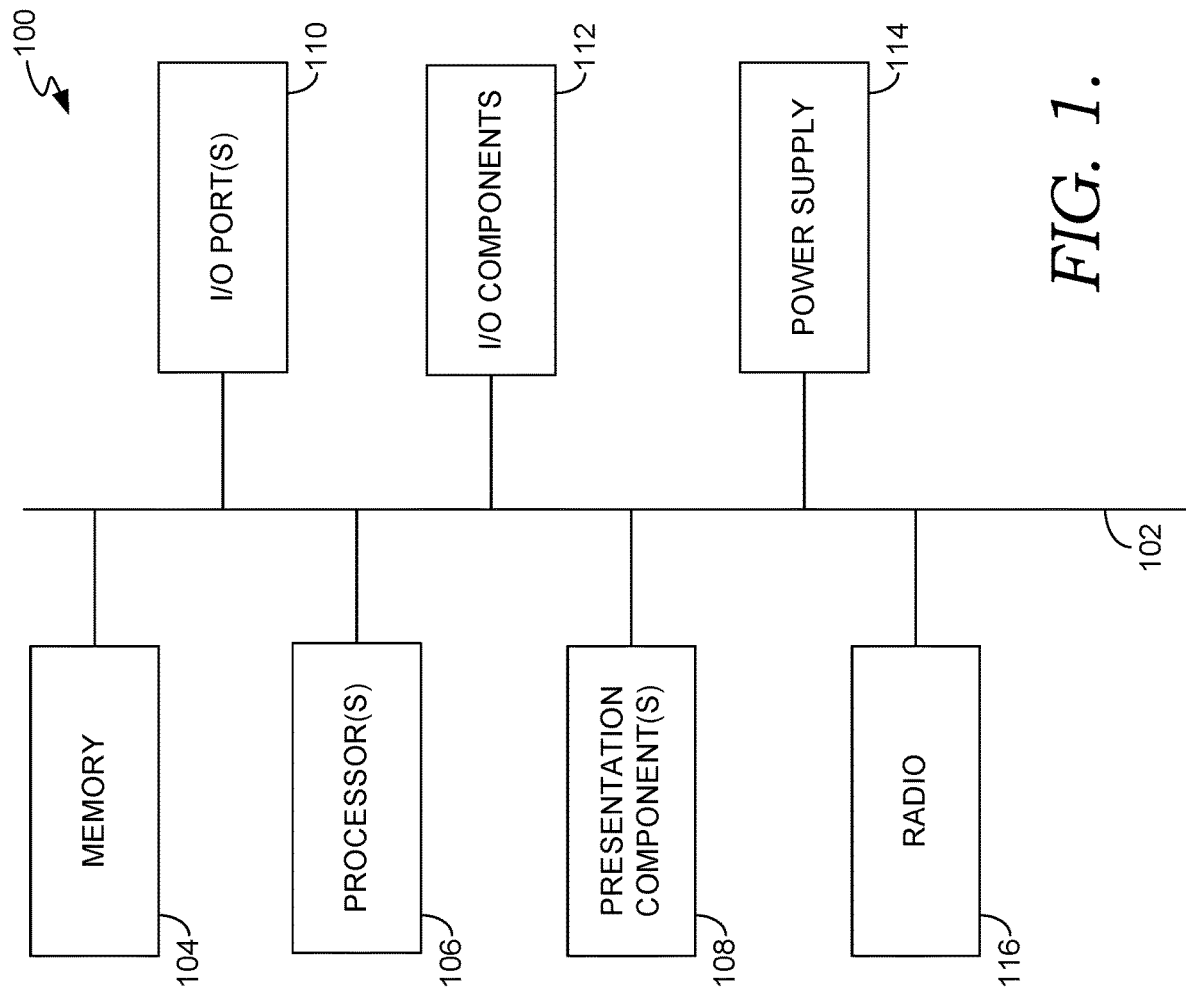
FIG. 1 depicts a diagram of an example computing environment suitable for use in implementations of the present disclosure.

The subject matter of embodiments of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BLER Block Error Ratio
CD-ROM Compact Disk Read Only Memory
CDMA Code Division Multiple Access
eNB Evolved Node B
gNB Next Generation Node B
GSM Global System for Mobile communications
DVD Digital Versatile Discs
EEPROM Electrically Erasable Programmable Read Only Memory
FD-MIMO Full Dimensional Multiple Input Multiple Output
IAB Integrated Access and Backhaul
LTE Long Term Evolution
MIMO Multiple Input Multiple Output
mMIMO Massive Multiple Input Multiple Output
mmWave Millimeter Wave
NR New Radio
NSA Non-Standalone
PC Personal Computer
PDA Personal Digital Assistant
RAM Random Access Memory
RF Radio-Frequency
RLFs Radio Link Failures
ROM Read Only Memory
RSRP Reference Signal Received Power
SA Standalone
SINR Transmission-to-Interference-Plus-Noise Ratio
TDD Time Division Duplex
Tx Transfer
UE User Equipment
UL Uplink
WiMAX Worldwide Interoperability for Microwave Access Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, 5G wireless telecommunication networks providing access for one or more network services (e.g., a telecommunication service) via at least one mmWave have an inherent issue of fading compared to low band frequencies. The high-frequency bands in mmWave systems (e.g., systems comprising the spectrum ranging from 24 GHz to 300 GHz) support large bandwidths, high data rates, and increase the capacity of telecommunication networks. In aspects, mmWave systems have a total of around 250 GHz bandwidths available. High fading in mmWave systems (e.g., fluctuation in RSRP in the system) results in poor UE performance. In conventional mmWave systems that experience fading, a gNB will assign a UE to a higher uplink MIMO based on channel conditions (e.g., as indicated by a rank indicator). As a result, due to the consequences of the fading in the system, the gNB receives data on only one transmit layer.

Due to the higher uplink MIMO assignment, the performance of the telecommunication service is impacted. The impacts of the performance comprise slower data transmission, more power being used by the UE to transmit data, inefficient use of UE power, and poor end user experience. As such, it would be desirable and beneficial for a system that transmits data faster and more efficiently when experiencing fading so that the impacts on performance experienced in conventional systems are alleviated.

The systems and methods provided herein can alleviate one or more of the problems with the conventional systems. As one example, a system for restricting an uplink MIMO assignment comprises one or more nodes each configured to wirelessly communicate with one or more user devices via at least one mmWave in a geographic service area and one or more processors. The one or more processors are configured to perform operations comprising receiving fading data from a plurality of user devices. Based on the fading data, the one or more processors determine that a threshold number of the plurality of user devices satisfies a threshold level of fading. In response to determining that the threshold number satisfies the threshold level of fading, the one or more processors restrict the uplink MIMO assignment for a user device satisfying the threshold level of fading. Further, the one or more processors assign the user device to a lower MIMO layer of available MIMO layers.

In other aspects, one or more non-transitory computer-readable media having computer-executable instructions embodied thereon that, when executed, perform a method for restricting an uplink MIMO assignment. The method comprises receiving fading data from a user device and determining the user device satisfies a threshold level of fading based on the fading data. In response to determining the user device satisfies the threshold level of fading, the method dynamically restricts the uplink MIMO assignment for the user device. In response to restricting the uplink MIMO assignment, the user device is assigned to a lower MIMO layer of available MIMO layers.

In yet another aspect, the present disclosure provides for a method restricting an uplink MIMO assignment. The method comprises receiving fading data from a plurality of user devices in communication with a cell sector corresponding to a cell site. Further, the method determines that a portion of the cell sector satisfies a threshold level of fading based on the fading data. Additionally, the method determines a user device is located within the portion of the cell sector and is in communication with the cell sector. In response to determining the user device is located within the portion of the cell sector that satisfies the threshold level of fading, the method dynamically restricts the uplink MIMO assignment for the user device. In response, the method assigns the user device to a lower MIMO layer of available MIMO layers.

Improvements over conventional methods and systems that the present disclose provides comprise faster data transmission, less UE power consumption when transmitting data, more efficient use of UE power, and improved end user experience. By dynamically restricting the uplink MIMO assignment, less transmission power is allocated to layers that are inefficiently transmitting data due to the fading experienced by the mmWave (e.g., fading detected by UEs via high RSRP fluctuations or uplink BLER). In addition, UEs experiencing low power headroom are able to optimally transmit data on one antenna with higher power than distributed power on two transmit antennas.

Turning now to FIG. 1, a diagram is depicted of an exemplary computing environment suitable for use in implementations of the present disclosure. In particular, the exemplary computer environment is shown and designated generally as UE/user device 100. The terms "UE" and "user device" are used interchangeably to refer to a device employed by an end-user that communicates using a network. User device 100 is but one example of a suitable computing environment and is not intended to suggest any limitation as to the scope of use or functionality of the invention. Neither should user device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, user device 100 includes bus 102 that directly or indirectly couples the following devices: memory 104, one or more processors 106, one or more presentation components 108, input/output (I/O) port(s) 110, I/O component(s) 112, power supply 114, and radio 116. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O component(s) 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "user device."

User device 100 typically includes a variety of computer-readable media. Computer-readable media can be any available media that can be accessed by user device 100. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 104, memory 104 includes computer-storage media in the form of volatile and/or nonvolatile memory. Memory 104 may be removable, nonremovable, or a combination thereof. Examples of memory 104 include solid-state memory, hard drives, optical-disc drives, etc. For instance, memory 104 may include RAM, ROM, Dynamic RAM, a Synchronous Dynamic RAM, a flash memory, a cache memory, a buffer, a short term memory unit, a long term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 106, the one or more processors 106 read data from various entities such as bus 102, memory 104 or I/O component(s) 112. The one or more processors 106 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 106 execute instructions, for example, of an Operating System of the user device 100 and/or of one or more suitable applications.

Further, the one or more presentation components 108 present data indications to a person or other device. Examples of one or more presentation components 108 include a display device, speaker, printing component, vibrating component, etc. Additionally, I/O port(s) 110 allow user device 100 to be logically coupled to other devices including I/O component(s) 112, some of which may be built in user device 100. Illustrative I/O component(s) 112 include a microphone, joystick, game pad, satellite dish, scanner, printer, wireless device, etc.

Turning to radio 116, the radio 116 facilitates communication with a wireless telecommunications network. For example, radio 116 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 116 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, mMIMO, 3G, 4G, 5G, and/or 802.11 protocols and techniques, etc.

Illustrative wireless telecommunications technologies that radio 116 may facilitate include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of user devices.

Figure 2:
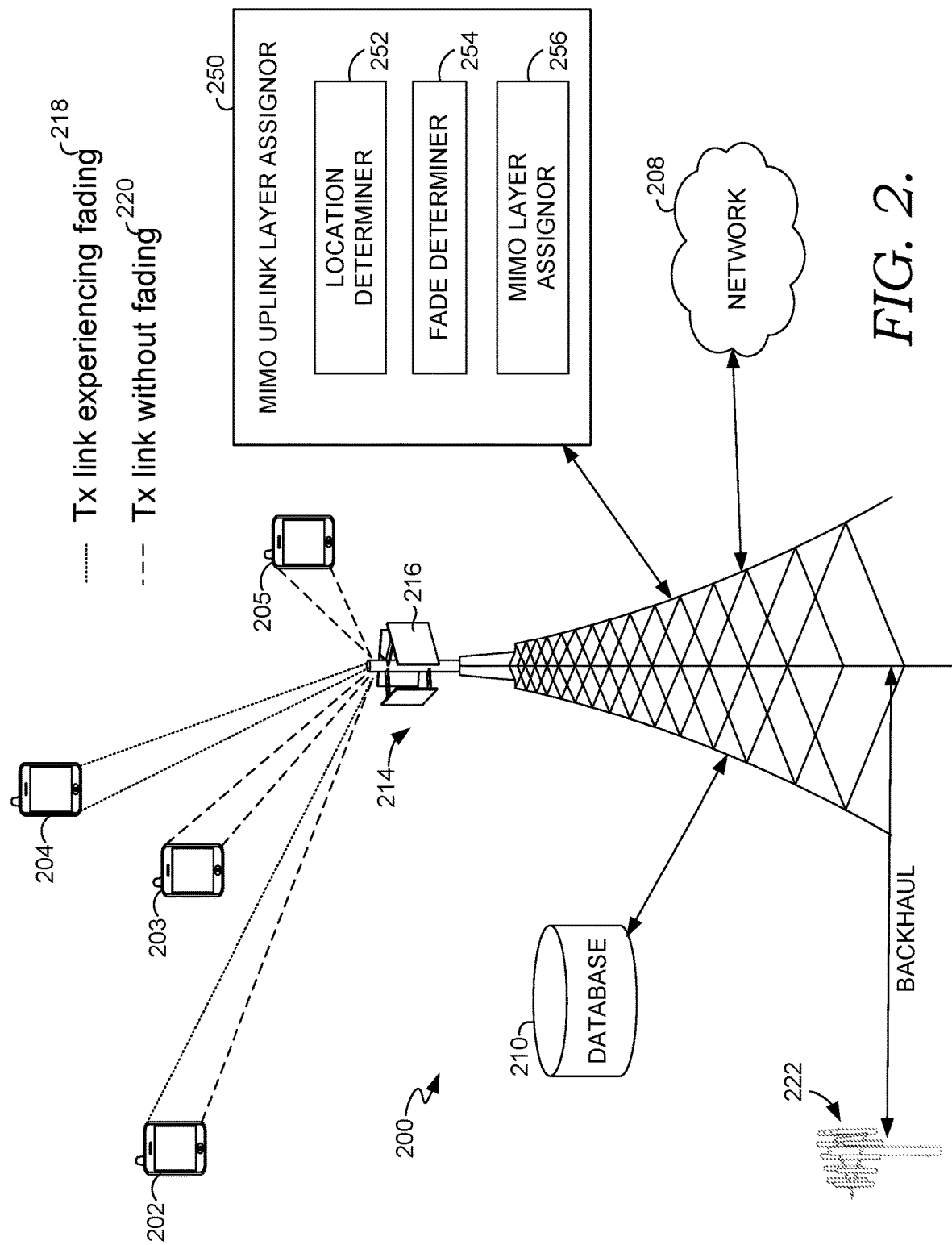
FIG. 2 depicts an example network environment in which implementations of the present disclosure may be employed.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure.

Neither should the network environment be interpreted as having any dependency or requirement relating to any one or combination of components illustrated.

Network environment 200 includes UEs 202-205 (e.g. user device 100), network 208, database 210, cell site 214 comprising one or more antenna arrays 216 transmitting Tx links 218 and 220, access point 222, and Controller 250. In other embodiments, network environment 200 may contain more than one network 208, more than one database 210, more than one cell site 214, and more than one access points 222. UEs 202-205 generally include one or more antennas coupled to a radio for exchanging (e.g., transmitting and receiving) transmissions with a nearby cell site (e.g. cell site 214), via one or more antenna arrays (e.g., antenna array 216). In embodiments, UEs 202-205 may take on any variety of devices, such as a PC, a laptop computer, a tablet, a netbook, a mobile phone, a smart phone, a PDA, a wearable device, a fitness tracker, a server, a CD player, an MP3 player, a GPS device, a video player, a handheld communications device, a workstation, a router, an access point, or any other device capable of communicating using one or more resources of the network 208.

Further, UEs 202-205 may include components such as software and hardware, a processor, a memory, a display component, a power supply or power source, a speaker, a buffer, a touch-input component, a keyboard, a radio, and the like. For example, UEs 202-205 may include a transceiver module for performing wireless communication between UEs 202-205 and other UEs (not depicted). The transceiver module may include a dual-band transceiver module configured for communicating over various frequency bands via one or more backhaul links (e.g. a wireless link or a wired link). Additionally, transceiver module may be configured for communicating with cell site 214 via one or more control links.

In some embodiments, the transceiver module may include at least one low-band transceiver (e.g. for communicating over one or more control links) and at least one high-band transceiver. In some embodiments, a transceiver of the transceiver module may perform the functionality of a cellular transceiver (e.g., an LTE transceiver) for communication over a non-mmWave (e.g., a 2.4 GHz frequency band). In some embodiments, other transceivers may perform the functionality of an mmWave transceiver (e.g., a WiGig or IEEE 802.11ad transceiver) for communication over an mmWave (e.g., a 60 GHz frequency band).

The transceiver module may also comprise one or more antennas suitable for transmitting and/or receiving wireless communication signals, blocks, frames, transmission streams, packets, messages and/or data. For example, the one or more antennas may include any an arrangement of one or more antenna elements, components, units, assemblies and/or arrays that are suitable for directional communication (e.g., beamforming techniques). In embodiments, the one or more antennas may include a phased array antenna, a multiple element antenna, a set of switched beam antennas, etc. In some embodiments, the one or more antennas may implement transmit and receive functionalities using separate transmit and receive antenna elements. In some embodiments, the one or more antennas may implement transmit and receive functionalities using common and/or integrated transmit/receive elements.

Furthermore, the UEs 202-205 may comprise any mobile computing device that communicates by way of a wireless network (e.g., 3G, 4G, 5G, LTE, CDMA, or any other type of network). In embodiments, UE 202 may be capable of using 5G and having backward compatibility with prior access technologies. In some embodiments, UE 203 may be capable of using 5G but lacks backward compatibility with prior access technologies. In some embodiments, UEs 202-205 are in communication with other UEs that are legacy UEs that is not capable of using 5G.

In some cases, the UEs 202-205 in network environment 200 may optionally utilize network 208 to communicate with other user devices (e.g., a mobile device(s), a server(s), a PC, etc.) through cell site 214. The network 208 may be a telecommunications network(s), or a portion thereof. Network 208 may comprise a 3G, 4G, 5G, or other next generation network. For example, the network 208 may comprise a 5G NR NSA operating in 28 GHz. As another example, the network 208 may include a 5G NR SA with microservices and service-based interfaces for end-to-end support. In some embodiments, network 208 may comprise a cloud-radio access network located in or associated with a cloud computing environment having various cloud network components.

A telecommunications network might include an array of devices or components (e.g., one or more cell sites), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Turning to cell site 214, the terms "cell site" and "base station" may be used interchangeably herein to refer to a defined wireless communications coverage area (i.e., a geographic area) serviced by a base station. Cell site 214 may control one geographical area. Alternatively, cell site 214 may control multiple geographical areas. The geographical area may be referred to as the "coverage area" of the cell site or simply the "cell," as used interchangeably hereinafter. In one aspect, the cell site 214 serves at least one sector of a cell associated with the cell site 214. In other aspects, the cell site 214 may comprise multiple transmit antennas for a plurality of cell sites, any one or more of which may serve at least a portion of the cell.

In particular, cell site 214 may be configured to wirelessly communicate with UEs 202-205 located within the geographical area defined by a transmission range and/or receiving range of the radio antennas of the one or more antenna arrays 216 of the cell site 214. Further, it may be assumed that it is undesirable and unintended by the network 208 that the cell site 214 provide wireless connectivity to the UEs 202-205 when the UEs 202-205 are geographically situated outside of the cell associated with cell site 214. At least one transmit antenna of antenna array 216 propagates a signal (e.g., an mmWave) from the cell site 214 to one or more of the UEs 202-205.

Cell site 214 may include one or more cells, band pass filters, radios, antennas, antenna arrays, power amplifiers, transmitters/receivers, digital signal processors, control electronics, GPS equipment, and the like. As discussed herein, cell site 214 is deployed in the network 208 to control and facilitate, via the one or more antenna arrays 216 comprising one or more mmWave nodes, the broadcast, transmission, synchronization, and receipt of one or more wireless signals in order to communicate with, verify, authenticate, and provide wireless communications service coverage to one or more UEs that request to join and/or are connected to a network.

In some aspects, the cell site 214 may comprise one or more macro cells (providing wireless coverage for users within a large geographic area). For example, macro cells may correspond to a coverage area having a radius of approximately 1-15 miles or more, the radius measured at ground level and extending outward from an antenna at the cell site. In some aspects, cell site 214 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site. In embodiments, cell site 214 is in communication with a plurality of in-door small cells.

Furthermore, the one or more small cells may support mmWaves via mmWave nodes corresponding to an antenna. Additionally, the one or more small cells may combine a plurality of 100 MHz channels. Continuing the example, the one or more small cells may also combine radio and antenna elements. Further, the one or more small cells may each have an Ethernet cable backhaul. Additionally, the one or more small cells may have the capability of transferring data to multiple user devices during a single point in time via a plurality of antennas (e.g. via an multi-user MIMO antenna system).

A network including both the one or more small cells and the one or more macro cells may be known as a heterogeneous network. A heterogeneous network may include Home eNBs, which may provide service to a closed subscriber group. The heterogeneous network may include Tx links 218 and 220 from UEs 202-205 to cell site 214 or downlinks (not depicted and also referred to as forward link transmissions) from cell site 214 to UEs 202-205. The Tx links 218-220 may use MIMO antenna technology, including spatial multiplexing, beamforming, or transmit diversity. The Tx links may be through one or more carriers, wherein each carrier is allocated in a carrier aggregation of up to a total of Yx MHz (x component carriers) used for transmission in each direction. The carriers may be adjacent to each other in some embodiments. Additionally, allocation of carriers may be asymmetric with respect to downlink and uplink (e.g., more or fewer carriers allocated for downlink than for uplink). Further, the component carriers may include a primary component carrier and one or more secondary component carriers.

In some aspects, the cell site 214, whether a macro cell, small cell, or heterogeneous network, may include gNB and may operate in mmWave frequencies. Cell site 214 operating in mmWave frequencies may utilize beamforming for path loss and short range coverage. Cell site 214 and UEs 202-205 may transmit a beamformed signal to UEs 202-205 in one or more transmit directions. The cell site 214 and UEs 202-205 may perform beam training to determine the best receive and transmit directions for each of the cell site(s) 214 and UEs. The transmit and receive directions for the cell site 214 or the UEs 202-205 may or may not be the same.

Antenna arrays 216 of cell site 214 may have one or more multi-directional antennas comprising a plurality of signal transmitters, each configured to broadcast a signal over a respective sector of coverage of the one or more multi-directional antennas. Antenna arrays 216 may each include a plurality of antennas, such as antenna elements, antenna panels, or antenna arrays to facilitate the beamforming. The antenna array 216 may radiate in a particular direction and thus may correspond to a particular sector of a cell site. In one embodiment, the antenna array 216 is configured for mMIMO. In one embodiment, the antenna elements of antenna array 216 may be partitioned into unequal groups, or alternatively "split" into equal halves, wherein each group or half operates to provide a coverage area for a distinct access technology when the antenna array 216 operates in a dual technology mode. When the antenna array 216 is operating in a dual technology mode, each portion of the antenna elements may operate using only one distinct protocol and/or access technology relative to the other portions in the antenna array 216.

Additionally, cell site 214 and antenna array(s) 216 may be configured for deployment of 2×2 uplink MIMO. For example, one or more antennas are 2×2 MIMO antenna arrays. In embodiments, cell site 214 has two 5G NR transmit power amplifiers that transmit via separate antennas. Continuing the example, an uplink data rate may limit the downlink data rate. Additionally, cell site 214 and antenna array(s) 216 may be configured for deployment of 4×4 uplink MIMO (four transmit antennas for broadcasting up to four clients simultaneously), deployment of 8×8 uplink MIMO (eight antennas for eight streams of data distributing payload across all eight antennas for transmissions over the same frequency band without eight independent polarizations) and/or deployment of a higher mMIMO RF interface. For example, the 8×8 MIMO may simultaneously transmit data to eight 1×1 clients, four 2×2 clients, two 4×4 clients, etc.

In some embodiments, the 8×8 MIMO may modulate two independent data streams each to four Wi-Fi clients (e.g., clients supported by Wi-Fi 6 and 2×2:2 MIMO radios). In some embodiments, the 8×8 MIMO may transmit a single data stream downlink to eight clients simultaneously in an environment with sizable physical distances between each client. In some embodiments, the mMIMO RF interface is in communication with a software-selectable radio that may operate as a 5 GHz radio (e.g., a 4×4 radio) or a 2.4 GHz radio (e.g., a 4×4 radio) with a different frequency. In some embodiments, the software-selectable radio may provide coverage on two or more 5 GHz channels.

Power over Ethernet requirements for 8×8 MIMO may be substantial, and in some cases may require 31 watts or more. The use of high energies in these MIMO configurations can cause large drains on Power over Ethernet resources and expenses. High energy use may drain battery life of UEs in communication with the high energy MIMO configurations. Further, deploying Wi-Fi throughout an environment having a high density of users and devices may result in interferences in multi-user MIMO conditions. Controller 250 eases these issues with respect to high energy power consumption and drained UE battery life.

Turning to access point 222, cell site 214 may be in communication with one or more access points 222 in urban or rural geographical areas. For example, cell site 214 may transmit multi-user MIMO communications for reception by multi-user MIMO configured access point 222. The multi-user MIMO transmissions may include two or more spatial streams or one or more spatial streams. Further, the one or more access points 222 may comprise a portion of a base station. One or more access points may also comprise one or more antennas, a radio, and/or a controller. Additionally, one or more access points 222 communicate with UEs that are within a geographical service area of the one or more access points 222, wherein the one or more access points 222 provide one or more protocols (e.g., 3G, 4G, 5G, and additional generation networks).

In embodiments, the one or more access points 222 comprise a 5G small cell with baseband functions and RF functions. The 5G small cell may be an indoor version or an outdoor version. In some embodiments, access point 222 comprises a 5G NR gNB remote radio unit comprising a 2×2 MIMO, a 4×4 MIMO, an 8×8 MIMO, and/or another higher mMIMO RF interface. In some embodiments, access point 222 comprises an indoor or outdoor 5G NR gNB baseband unit that connects remote radio heads via common public radio interface fiber optic connections. In some embodiments, cell site 214 is in communication with multiple access points (not depicted for simplicity), including a simple repeater and a smart repeater having multi-beam operations and TDD awareness. In some embodiments, the multiple access points include a plurality of IAB nodes. In some embodiments, the multiple access points include a plurality of IAB, a plurality of the small cells, and a plurality of the remote radio units.

Furthermore, cell site 214 and access point 222 may be in communication via a backhaul. Backhaul may be wired or wireless and may comprise dark fiber for 5G communication services. In aspects, backhaul may be connected via wireless links to a section of the network 208 and also connected via a wire to another section of the network 208. Backhaul may be fully integrated with 5G NR access via deployed access point(s) 222, the deployed access point(s) 222 including macro sites at rooftops and towers, and street sites at poles, walls, etc. In embodiments, IAB is utilized for multi-hop backhauling with the same or different frequency bands. Continuing the example, the multi-hop backhauling is a distributed routing scheme in which each small cell forms a neighbor relationship only with its immediately connected small cells or picocell. In other embodiments, the backhaul may include a multi-path and multi-hop architecture in the mmWave frequency band. In some embodiments, IAB mobile termination may be employed via a separate antenna or shared access antenna of cell site 214. IAB may also be used for supporting low-power indoor radio notes.

Turning to Controller 250, the Controller 250 may include Location Determiner 252, Fade Determiner 254, and MIMO Layer Assignor 256. Controller 250 is in communication with cell site 214, UEs 202-205, network 208, database 210, and access point 222. Controller 250 may determine a signal strength of a signal from one or more cell sites 214 and one or more access points 222. As one example, controller 250 may determine a Wi-Fi signal from a Wi-Fi access point. Additionally, the Controller 250 may monitor one or more of throughput, signal quality information (e.g., SINR), a quantity of unique users/subscribers, a quantity of unique UE(s), and/or RLFs that occur at the cell site 214, all of which may be monitored dynamically and/or as stored in database 210.

Controller 250 may also determine whether UEs 202-205 are in communication with cell site 214 or access point 222. For example, to determine a UE is in communication with cell site 214 or access point 222, Controller 250 may use grant information from cell site 214 upon granting UEs 202-205 access to a particular mmWave. Grant information includes granted access to transmissions via the same, similar, or different transmission opportunities or subframes. Additionally, the grant information may include a format of the particular message that granted the particular UE access (e.g., different downlink control indicator formats). Other grant information may include a physical uplink shared channel or control information (e.g., a physical uplink control channel). Controller 250 may also use information relating to the physical uplink control channel (e.g., payload size, feedback, bandwidth, and channel state information) to determine a UE is in communication with cell site 214 or access point 222. In some embodiments, the grant information is used to determine UEs 202-205 are connected to a same cell sector of cell site 214.

Controller 250 may also determine whether one or more of UEs 202-205 have a battery level below a threshold. In embodiments, determining the battery level is below the threshold may be based on one or more of a percentage of a remaining battery life, RAM, level of brightness settings, type of battery, and a current battery consumption rate. In some embodiments, one of UEs 202-205 is a smart watch and is communicating with cell site 214 via an mmWave and has a lower transmit and receive power and/or a lower input and output power than another one of UEs 202-205 that is in communication with cell site 214 via an mmWave. Continuing the example, the Controller 250 determines the battery level threshold for the smart watch is lower than the battery level threshold for the another one of the UEs 202-205 based on the lower input and output power capability of the smart watch.

Turning to the Location Determiner 252, one or more locations of UEs 202-205 (and other UE's not depicted) may be determined in various ways. For example, UE location is determined using location information from the cell site 214 and/or the respective UE via GPS or other satellite location services, terrestrial triangulation, an access point location, and/or any other means of obtaining coarse or fine location information. In some embodiments, Location Determiner 252 may use current location information and historical location information comprising GPS coordinates stored in database 210 and/or local UE databases. In embodiments, location information is updated after each subsequent predetermined time period (the predetermined time period configurable by a network operator, for example). Current and historical location information may be used for determining that two or more of the UEs 202-205 are connected to a same cell sector of cell site 214.

In other embodiments, Location Determiner 252 determines a distance of one or more of UEs 202-205 from another UE, from cell site 214, or from access point 222 using trilateration and satellite positioning. Continuing the example, Location Determiner 252 compares UE satellite positioning with a location of the cell site 214. In some embodiments, the location of one or more of UEs 202-205 may be determined via a signal strength of an mmWave detected by the respective UE. In other embodiments, Location Determiner 252 may determine a location of a UE via a coverage map comprising a plurality of RSSI values for various locations. In some embodiments, Location Determiner 252 determines a location of UEs 202-205 by tracking the respective UE via an RF beam. Additionally or alternatively, Location Determiner 252 may use terrestrial triangulation and location information stored in database 210.

Location information may include whether UEs 202-205 or other UEs are located outdoors or in a building. In embodiments, location information includes a geographic location of UEs 202-205 and a three dimensional location. In some embodiments, location information may include a physical address. In some embodiments, location information is used to determine that a UE is in communication with cell site 214 or access point 222. In other embodiments, location information is used to determine whether one or more of UEs 202-205 are within a range of cell site 214 or access point 222. For example, Location Determiner 252 may determine one or more of UEs 202-205 are within a range for beamforming. Beamforming information may be used for determining that two or more of the UEs 202-205 are connected to a same cell sector of cell site 214.

Turning to Fade Determiner 254, Fade Determiner 254 determines a UE, or that a threshold number of UEs, satisfies a threshold level of fading based on fading data received from the UE, multiple UEs, and/or from other devices. The fading data received may include, for example, RSRP data, detected amplitude changes, and detected signal echo time delays. For example, the signal echo time delays may include one or more echo request messages to an echo service hosted by the Controller 250, which then receives echo response messages. The signal echo time delays may be calculated for each echo response message (e.g., a round trip time for the transmitted and received echo response messages). Further, the fading data received may also include an uplink BLER and a signal-to-noise ratio.

Satisfaction of the threshold level of fading may be based on fast fading, propagation loss, and/or delay spread. In embodiments, satisfaction of the threshold level of fading is based an average fade duration over a period of time. In some embodiments, satisfaction of the threshold level of fading is based on a comparison of a signal strength of a particular mmWave with another mmWave. In some embodiments, satisfaction of the threshold level of fading is based on fading measurements received from the other devices that have an mmWave fading measurement model (e.g., a model chosen among Rayleigh, Rice, Nakagami-m, $\alpha$-$\mu$, $\kappa$-$\mu$, $\eta$-$\mu$, and $\alpha$-$\eta$-$\kappa$-$\mu$ that best fits the fading data received).

Further, determining satisfaction of the threshold level of fading may also be based on a combination of factors including one or more of: angular spread, fading amplitude, frequency domain level crossing rate, large-scale fading coefficients, small-scale fading coefficients, first-order fading statistics, second-order fading statistics, polarization at transmitter and/or receiver, distance between mmWave node and UE, and fast fading distribution changes, coherence distance, average fade duration, and spatial auto-covariance. Additionally, in some embodiments, the determination is based on a maximum Doppler frequency and different envelope distributions. Further, the determination may also be based on a plurality of channel quality information (e.g., the observed SINR, anticipated current or backhaul link traffic, mmWave feedback received from a feedback reporting procedure, and indoor fading measurements of mmWaves transmitted by an indoor 5G small cell).

Fade Determiner 254 may also determine whether the threshold level of fading was satisfied based on the mmWave (or other mmWaves) in communication with UEs 202-205 having a high loading volume. As one example, the loading volume may be determined based on an amount of data queued for transmission by the mmWave on a backhaul link. Further, the amount of data queued may be determined based on a quantity of UEs in communication with the mmWave. Furthermore, the amount of data queued may be determined based at least in part on the grant information and historical loading data of UEs for the mmWave.

Further, the threshold level of fading may be determined based on an mmWave uplink BLER (a ratio data blocks in error to be retransmitted to the total number of data blocks transmitted) and/or RSRP fluctuations. For example, the threshold may be determined using the uplink BLER versus signal-to-noise ratio. Continuing the example, a Monte Carlo simulation may be used for the uplink BLER versus signal-to-noise ratio. Uplink BLER values may be obtained from a plurality of subframes. In embodiments the uplink BLER may be determined using a radio communication tester and is based on a rate of transmission. Further, the threshold may be determined based on RSRP fluctuation measurements received from one or more of UEs 202-205 over a period of time. In addition, the RSRP fluctuation measurements may be determined based on employed receive beams and reports that UEs 202-205 send to the network 208.

Turning now to MIMO Layer Assignor 256, the MIMO Layer Assignor 256 dynamically restricts an uplink MIMO assignment for one or more UEs that satisfy the threshold level of fading and dynamically assigns the one or more UEs to a lower MIMO layer of available MIMO layers. For example, because UEs 202 & 204 have Tx links 218 experiencing fading, MIMO Layer Assignor 256 dynamically restricts Tx links 218 for UEs 202 & 204 and dynamically assigns Tx links 218 for UEs 202 & 204 to a lower MIMO layer of available MIMO layers. Further, the dynamic restriction and the dynamic assignment are based on determinations made by one or more of Controller 250, Location Determiner 252, and Fade Determiner 254. For example, assigning the one or more of UEs 202-205 to the lower MIMO layer may be based on the respective UE's battery level being below a threshold, which results in eased issues with respect to high energy power consumption and drained UE battery life.

In some embodiments, the lower MIMO layer is a 2×2 MIMO layer and the available MIMO layers comprise a 4×4 MIMO layer. In other embodiments, the lower MIMO layer is a 4×4 MIMO layer and the available MIMO layers comprise an 8×8 MIMO layer corresponding to eight antennas of the cell site. In some embodiments, the available MIMO layers comprise 2×2, 4×4, and 8×8 MIMO layers. Furthermore, upon dynamic restriction and dynamic assignment, Tx links 218 for UEs 202 & 204 assigned to the lower MIMO layer may transmit data via the lower MIMO layer.

In some embodiments, an uplink signal corresponding to the lower MIMO layer comprises a single-beam signal communicated over an mmWave network. In some embodiments, the Tx links 218 for UEs 202 & 204 assigned to the lower MIMO layer may transmit data via closed-loop spatial multiplexing. Additionally, the closed-loop spatial multiplexing may be facilitated by two antennas of the cell site 214. In some embodiments, A Pre-coding Matrix Indicator is fed back to the cell site 214 from the UEs 202 & 204 following transmission of the data.

In some embodiments, MIMO Layer Assignor 256 may assign the user device to a higher MIMO layer of the available MIMO layers upon determining that one or more of UEs 202-205 no longer satisfies the threshold level of fading. For example, the Tx link 218 that is experiencing fading by UE 202 may, at a later time (not depicted), no longer satisfy the threshold level of fading. At that point, UE 202 could be assigned the higher MIMO layer. As another example, because UE 203 has Tx links 220 that are not experiencing fading, UE 203 may automatically be assigned to the higher MIMO level.

Additionally, the assignment to the higher MIMO layer may also be determined based on location information of the UEs 202-205. For example, assignment to the higher MIMO layer may also depend on a signal strength the respective UE is receiving from the higher MIMO level. Further, the assignment to the higher MIMO layer may also be determined based on a user device being located within an mmWave cell sector of cell site 214 but outside of a portion of the cell sector experiencing fading. In this example, a Tx link 220 may transmit data via the higher MIMO layer upon the assignment to the higher MIMO layer.

Turning now to FIG. 3, flow diagram 300 begins at block 302 receiving fading data from one or more user devices, cell sites, and/or other devices. In aspects, fading data is received from one or more user devices in communication with an mmWave cell sector corresponding to a cell site. In some embodiments, it is determined that at least two user device are connected to a particular cell sector of cell site 214. In some embodiments, it is determined that a user device is located within a portion of the mmWave cell sector and that the user device is in communication with the mmWave cell sector before receiving the fading data from the user device. Further, block 304 comprises determining the one or more user devices satisfy a threshold level of fading based on the fading data received. In some embodiments, satisfaction of the threshold level of fading is determined based on fading data corresponding to the mmWave cell sector.

At block 306, an uplink MIMO assignment is dynamically restricted. The restriction is based on determining one or more user devices satisfy the threshold level of fading. In some embodiments, the restriction is based on determining that a threshold number of user devices satisfy the threshold level of fading. In some embodiments, the restriction is based on determining the user device is located within the portion of the mmWave cell sector that satisfies the threshold level of fading.

At block 308, a user device is assigned to a lower MIMO layer of available MIMO layers. Assignment to the lower MIMO layer is based on the user device satisfying the threshold level of fading. Assignment to the lower MIMO layer may also be based on a battery level of the UE being below a second threshold. In some embodiments, the lower MIMO layer is a 4×4 MIMO layer and the available MIMO layers comprises an 8×8 MIMO layer corresponding to eight antennas of the cell site. Lastly, at block 310, data is transmitted from the user device assigned the lower MIMO layer via the lower MIMO layer.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for restricting an uplink Multiple Input Multiple Output (MIMO) assignment, the system comprising:
   one or more nodes, each of the one or more nodes configured to wirelessly communicate with one or more user devices via at least one millimeter wave (mmWave) in a geographic service area; and
   one or more processors configured to perform operations comprising:
   receiving battery data from a user device of the one or more user devices;
   based on the battery data, determining that the battery data of the user device is below a threshold; and
   in response to determining that the battery data of the user device is below the threshold, restricting assignment of the user device to a MIMO layer of available MIMO layers.

2. The system of claim 1, wherein the battery data comprises a value corresponding to remaining battery life.

3. The system of claim 1, wherein the battery data comprises a brightness level and a current battery consumption rate.

4. The system of claim 3, wherein the battery data comprises a type of battery.

5. The system of claim 1, the operations further comprising assigning the user device to one of the available MIMO layers, the one of the available MIMO layers being a lower MIMO layer than the MIMO layer being restricted.

6. The system of claim 5, wherein a signal corresponding to the lower MIMO layer comprises a single-beam signal communicated over an mmWave network.

7. The system of claim 5, wherein the lower MIMO layer is configured to facilitate closed-loop spatial multiplexing via the one or more nodes.

8. The system of claim 5, wherein the lower MIMO layer is a 2×2 MIMO layer and the available MIMO layers comprise a 4×4 MIMO layer.

9. One or more non-transitory computer-readable media having computer-executable instructions embodied thereon that, when executed, perform a method for restricting an uplink Multiple Input Multiple Output (MIMO) assignment, the method comprising:
   receiving location data corresponding to a user device;
   based on the location data, determining that the user device is located within a portion of a geographic service area, the portion identified for restricting the uplink MIMO assignment, the geographic service area being provided by a cell site configured to wirelessly communicate with the user device via at least one millimeter wave (mmWave); and
   in response to determining the user device is located within the portion of the geographic service area, restricting assignment of the user device to a MIMO layer of available MIMO layers.

10. The one or more non-transitory computer-readable media of claim 9, further comprising assigning the user device to one of the available MIMO layers, the one of the available MIMO layers being a lower MIMO layer than the MIMO layer being restricted.

11. The one or more non-transitory computer-readable media of claim 10, further comprising re-assigning the user device to a higher MIMO layer, of the available MIMO layers, than the one of the available MIMO layers upon determining that the user device is no longer located within the portion of the geographic service area.

12. The one or more non-transitory computer-readable media of claim 9, wherein the portion of the geographic service area is identified by:
   receiving location data and fading data from a plurality of user devices located within the portion of the geographic service area;
   determining the fading data from each of the plurality of user devices satisfies a threshold level of fading; and
   identifying the portion of the geographic service area using the location data from the plurality of user devices.

13. The one or more non-transitory computer-readable media of claim 12, wherein the fading data from each of the plurality of user devices comprises uplink block error ratios and a signal-to-noise ratio.

14. The one or more non-transitory computer-readable media of claim 13, wherein the threshold level of fading is determined based on a loading volume associated with an amount of data queued for transmission by the at least one mmWave.

15. A method for restricting an uplink Multiple Input Multiple Output (MIMO) assignment, the method comprising:
receiving battery data from a user device associated with a cell site configured to wirelessly communicate with the user device via at least one millimeter wave (mmWave);
based on the battery data, determining that the battery data of the user device is below a threshold; and
in response to determining that the battery data of the user device is below the threshold, restricting assignment of the user device to a MIMO layer of available MIMO layers.

16. The method of claim 15, wherein the battery data comprises a value corresponding to remaining battery life, a brightness level, and a current battery consumption rate.

17. The method of claim 15, further comprising assigning the user device to one of the available MIMO layers, the one of the available MIMO layers being a lower MIMO layer than the MIMO layer being restricted.

18. The method of claim 17, wherein the lower MIMO layer includes a single-beam signal associated with the at least one mmWave.

19. The method of claim 17, further comprising re-assigning the user device to the MIMO layer of the available MIMO layers upon determining that the battery data of the user device is above the threshold.

20. The method of claim 17, wherein the lower MIMO layer is a 4×4 MIMO layer and the available MIMO layers comprise an 8×8 MIMO layer corresponding to eight antennas of the cell site.

* * * * *